Jan. 16, 1940.　　　　　E. W. BAKER　　　　　2,187,297
WORK HANDLING APPARATUS FOR MACHINE TOOLS AND THE LIKE
Filed March 30, 1938　　　3 Sheets-Sheet 1
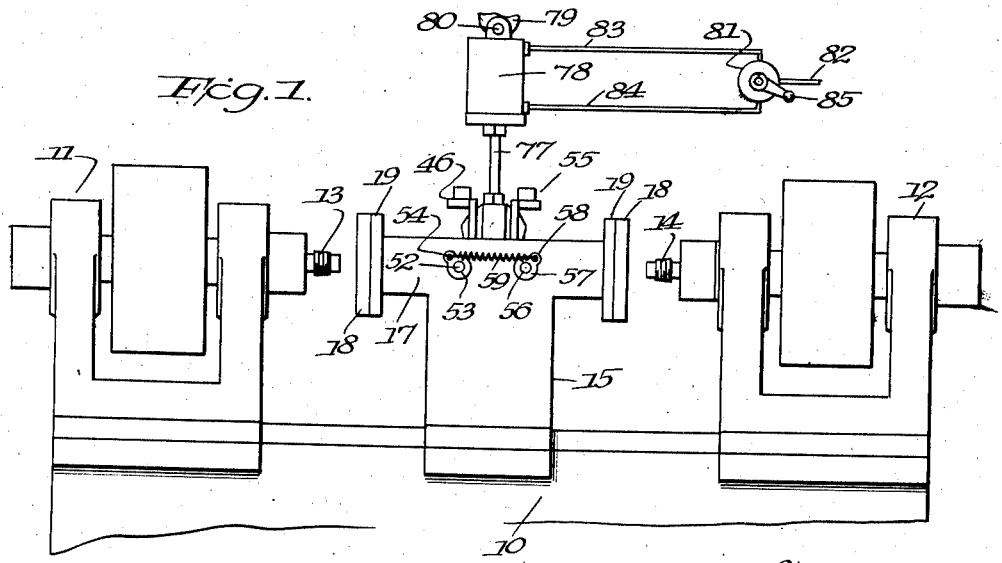
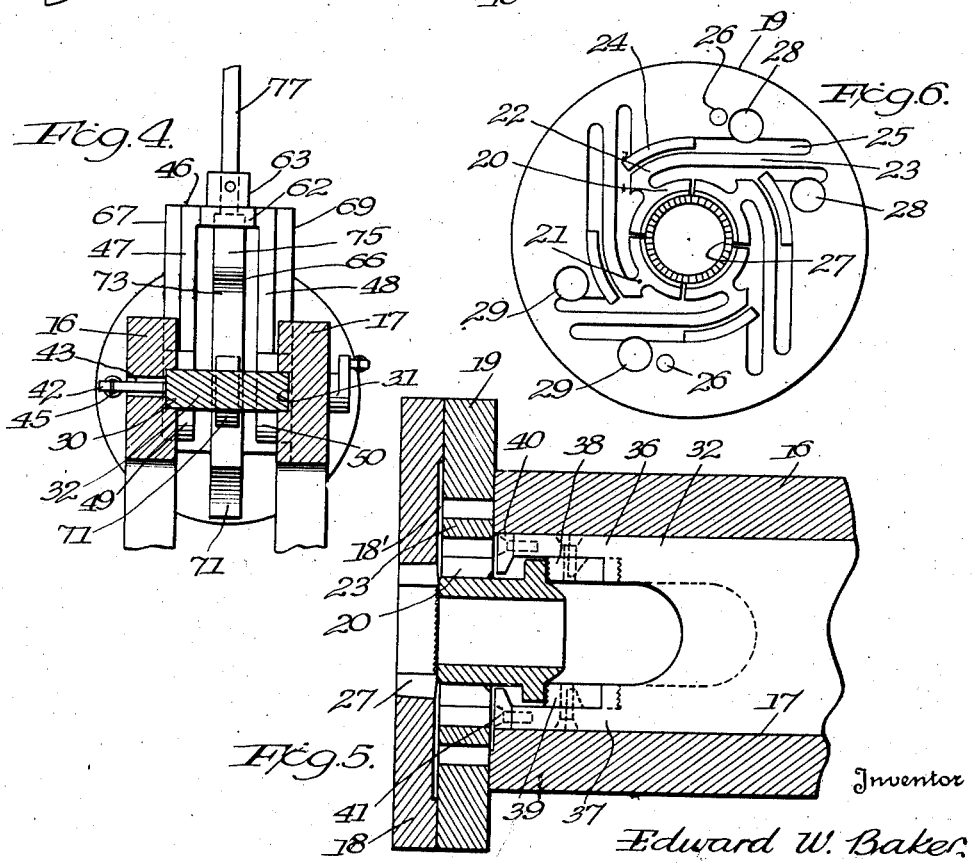
Inventor
Edward W. Baker
By Cushman, Darby & Cushman
Attorneys Jan. 16, 1940.   E. W. BAKER   2,187,297
WORK HANDLING APPARATUS FOR MACHINE TOOLS AND THE LIKE
Filed March 30, 1938    3 Sheets-Sheet 2

Inventor
Edward W. Baker
By Cushman, Darby & Cushman
Attorneys

Jan. 16, 1940.   E. W. BAKER   2,187,297
WORK HANDLING APPARATUS FOR MACHINE TOOLS AND THE LIKE
Filed March 30, 1938   3 Sheets-Sheet 3

Inventor
Edward W. Baker.

Patented Jan. 16, 1940

2,187,297

UNITED STATES PATENT OFFICE 2,187,297

WORK HANDLING APPARATUS FOR MACHINE TOOLS AND THE LIKE

Edward W. Baker, Lexington, Mass., assignor to Jefferson Union Company, Lexington, Mass., a corporation of Massachusetts Application March 30, 1938, Serial No. 199,039

21 Claims. (Cl. 10—129)

The present invention relates to work handling apparatus particularly adapted for combination with machine tools such as tapping machines. The object of the invention is to provide apparatus which will receive the work and rapidly transfer it to a position to be operated on by the tool, will firmly hold the work during the operation thereon, and will then quickly release the work. Desirably, the mechanisms are duplicated so that two work pieces may be operated on simultaneously.

As exemplifying the invention I have shown it in the accompanying drawings as embodied in apparatus for internally tapping tubular fittings and the principles of the invention will be explained with reference to these drawings in which:

Figure 1 is an elevation of a tapping machine provided with the work handling apparatus of the present invention.

Figure 4 is a section substantially on line 4—4 of Figure 3.

Figure 5 is a section substantially on line 5—5 of Figure 2,

Figure 6 is an elevation of a work centering device, and

Figure 2:
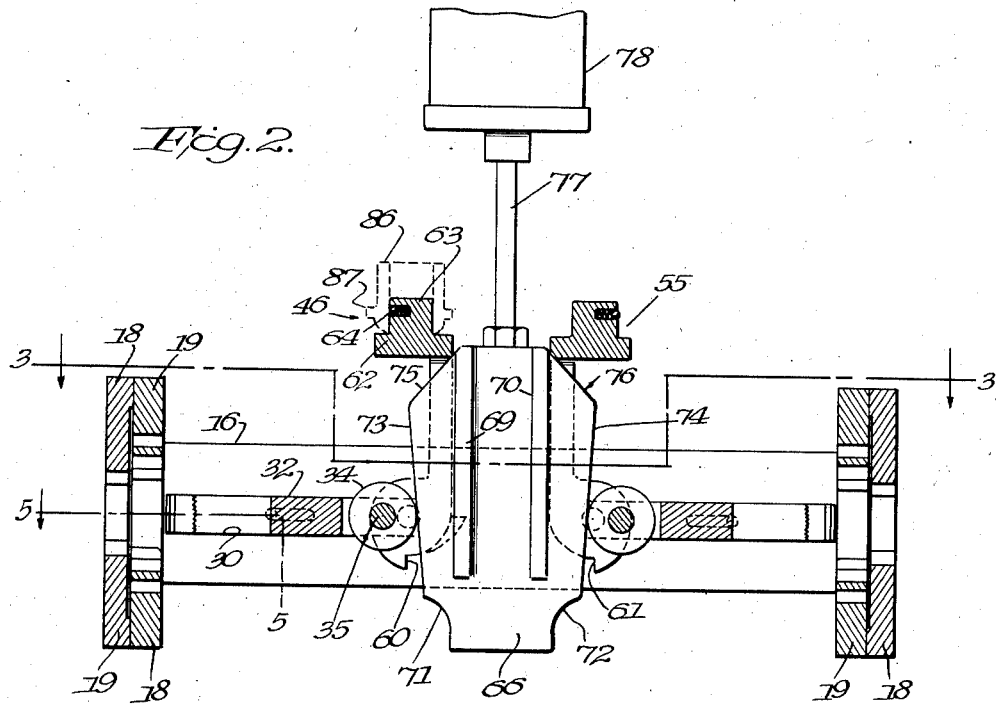
Figure 2 is a vertical longitudinal section of the work handling apparatus of Figure 1 on an enlarged scale.
Figure 3:
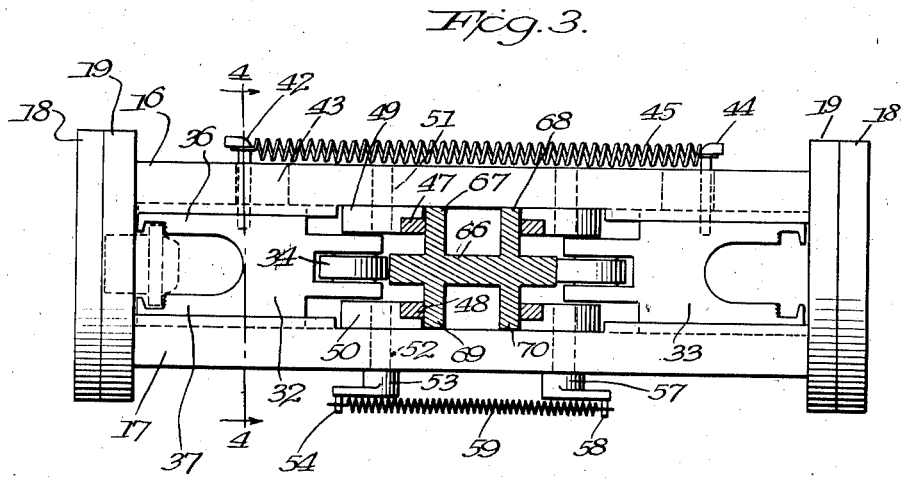
Figure 3 is a section substantially on line 3—3 of Figure 2.

Referring to the drawings, reference numeral 10, Figure 1, denotes generally the bed of a tapping machine, the bed supporting at its ends the two tapping heads 11 and 12 which include the taps 13 and 14, the taps being rotatable on a common horizontal axis. Through control means not shown, the taps are adapted to be simultaneously projected toward each other while rotating in a tapping direction and then to be reversed as to direction of rotation, where non-collapsing taps are used, and moved apart. Mounted on the central portion of the bed is a frame comprising a base 15 to the top of which is secured a pair of parallel horizontally extending rails 16 and 17. To the ends of the rails are secured abutment and centering assemblies comprising the circular plates, as here shown, 18 and 19.

The plate 19, Figure 6, is machined to provide a central circular socket having four segmental wall portions 20, each of which has a central outward radial projection 21 merging with the arcuate end portion 22 of a spring arm which has an elongated rectilinear portion 23 merging with the outer body portion of the plate. The projections 21 are at about a 45° angle to the rectilinear portions 23 and the latter are disposed substantially as the sides of a rectangle. The diameter of the socket is somewhat smaller than the maximum transverse dimension of the work piece to be centered so that yielding centering action is secured. Flexing of the spring arms is limited by blocks 24 secured in the slots 25 by means of screws passed from the periphery of the plate. The centering means, as here shown, is machined from a single plate, with the exception of blocks 24. It may, however, be built up from separate pieces.

Plate 19 is assembled as a unit with plate 18 by means of screws 26. Plate 18 has a central circular opening whose walls are somewhat converged away from plate 19 and receive non-rotatably a hardened abutment ring 27 whose edge toward plate 19 is knurled. Adjacent plate 19, plate 18 is relieved at 18' so as to obviate interference with the free movement of the movable centering elements.

The abutment and centering units are secured to the ends of the rails by means of cap screws passed through openings 28 into one of the rails and through openings 29 into the other, the units being coaxial with taps 13 and 14. Suitable clearance is provided between the movable centering elements and the rail ends.

The end portions of rails 16 and 17 are somewhat inwardly thickened and provided with horizontal guide grooves 30 and 31 which receive reciprocable slides 32 and 33 which are of identical form. Slide 32 will be particularly described and it will be understood that the same description will apply to slide 33.

At its inner end slide 32 is laterally recessed and longitudinally slotted centrally to provide arms between which is journaled a roller 34 on an axle 35, Figure 2. The forward or outer end of the slide is provided with a wide central longitudinal slot so that arms 36 and 37 are provided. Secured against the inner faces of the arms are hardened blocks 38 and 39 which inwardly are in engagement with abutment shoulders and forwardly are provided with knurled surfaces, Figure 5. To the extremities of the arms are secured, through tongue and groove joints, inwardly projecting jaw pieces 40 and 41. A pin 42 projects from one side of slide 32 through a longitudinally extending slot 43 in rail 16. Slide 33 has a similar pin 44 and the two are connected by a tension spring 45 so that the slides are yieldingly drawn together.

A work transfer member 46 comprises a pair of parallel arms 47 and 48 which at one end have offset bosses 49 and 50 which are disposed between the inner faces of the rails and the reduced inner end of slide 32, the bosses being pierced to receive pivot pins 51 and 52 which are disposed in aligned bores in rails 16 and 17. Pin 52 is fixed in boss 50 and is rotatable in its receiving bore. At its outer end the pin has fixed thereon a head 53, Figure 1, which carries an eccentric pin 54.

The transfer member as herein shown is intended to swing between a vertical work receiving or loading position and a horizontal work discharging position. When the member 46 is in its vertical position, Figure 1, pin 54 is on a radius which extends away from the longitudinal axis of member 46 at an angle of 45°. Consequently, when member 46 is moved to horizontal position, pin 54 will move from a position 45° above the horizontal plane of its pivoting axis to a position 45° below such plane. A second work transfer member 55 is the same in form and arrangement as member 46, but is mounted to swing in a clockwise direction instead of a counter-clockwise direction. Its pivot pin 56 has secured thereto a head 57 which carries an eccentric pin 58 disposed in opposite manner to the pin 54 and the two pins are connected by a tension spring 59. It will be evident that with the parts as shown in Figure 1, spring 59 will act to urge members 46 and 55 upwardly toward each other, whereas when members 46 and 55 move to their horizontal positions, dead center will be passed and the spring will tend to swing the members downwardly.

Bosses 49 and 50 are provided with lugs as at 60 having abutment faces directed inwardly and substantially vertically and in the axial plane of the pivot pins 51 and 52 when member 46 is in its illustrated vertical position. When member 46 is in its horizontal position the lugs occupy the dotted line position of Figure 2. The bosses of member 55 have the similar abutment faces 61, Figure 2.

At their free ends arms 47 and 48 of member 46 are connected by a perpendicular flange 62 which is off-set from the arms in the same direction as the bosses 49 and 50. Flange 62 is surmounted by a cylindrical outwardly projecting stud 63 laterally recessed and provided with a spring-pressed ball detent 64.

Member 55 has all of the described provisions of member 46.

Vertically reciprocable between the axis of members 46 and 55 is a wedge-shaped actuating member 66 which has laterally projecting flanges 67, 68, 69 and 70 whose outer edges are slidably guided by the inner faces of rails 16 and 17. These flanges terminate a distance above the bottom of member 66 as shown in Figure 2. The edges of member 66, which are in cooperating relation with the slide rollers, have the abrupt arcuate cam rises 71 and 72 at their lower extremities, these being surmounted by the rectilinear cam surfaces 73 and 74 which are upwardly divergent at a relatively slight angle to the vertical. Edges 73 and 74 are in turn surmounted by the comparatively abrupt rectilinear cam surfaces 75 and 76 which are upwardly convergent. Member 66 depends from a piston rod 77 whose upper end is fixed to a piston which is reciprocable in a cylinder 78, the latter being pivotally supported from a fixed bracket 79, Figure 1, by means of a pin 80 which is perpendicular to the plane of member 66. A valve 81, Figure 1 is adapted to lead compressed air from a supply line 82 through one or the other of tubes 83, 84 to the top or bottom of cylinder 78 for the purpose of reciprocating member 66, the direction of movement of member 66 being determined by the manipulation of the valve actuating lever 85.

In the use of the apparatus, a tubular fitting 86, which is to be internally threaded, is mounted on stud 63 and is yieldingly retained by the detent 64. The fitting, as shown, has at its end adjacent flange 62, an annular rib 87. The fitting 86, as shown, is the ball part of a ball and socket joint, and the socket part (not shown), which is of generally similar external form in that it includes a rib as at 87, may be mounted on the stud of member 55.

With the parts in the position shown in Figure 2, actuating member 66 may be assumed to be moving rapidly upwardly by reason of the fact that compressed air has been introduced into the bottom of cylinder 78. The slide rollers are bearing against surfaces 73 and 74 by reason of the action of spring 45 and the slides are consequently moving towards each other. Cam surfaces 75 and 76, striking the flanges of members 46 and 55, throw or knock the latter outwardly to horizontal positions in which the flanges, as 62, of the members 46 and 55 come to lie in the outer end recesses of the slides. This occurs as the slide rollers reach the lower extremities of cam surfaces 71 and 72, the position of the slides being then as indicated by the dotted lines in Figure 5, and members 46 and 55 have been enabled to reach their horizontal positions by reason of the fact that the annular ribs of the work pieces have been received between the jaw pieces of the slides. Downward movement of members 46 and 55 is limited by contact of their arms with the top surfaces of the slides and rebound is prevented by reason of the fact that pins 54 and 58, Figure 1, have passed below dead-center so that spring 59 is acting to urge the members downwardly. When members 46 and 55 are in their horizontal position, in which their arms lie flatly on the slides, the studs are coaxial with the centering and abutment rings and consequently the work pieces are also in coaxial disposition with the latter.

As member 66 is now caused to move downwardly, the slides are at first moved rapidly outwardly due to the form of cam surfaces 71 and 72. During this movement of the slides the work pieces are substantially stripped from the bosses and pressed into the centering device. As downward movement of member 66 continues, and the slide rollers ride on surfaces 73 and 74, stripping of the work pieces from the studs is completed and the outer ends of the work pieces are pressed against the knurled surfaces of the abutment rings, the pressures being equalized due to the free adjustability of member 66 about pivot 80. The slide position is shown in full lines in Figure 5. As soon as the work pieces have been moved off of the studs the lower ends of ribs 67 to 70 strike the abutments as at 60 and 61, Figure 2, and throw or knock members 46 and 55 back to vertical position, the return being assisted by spring 59 as soon as dead-center has been passed, the spring serving also to prevent undue rebound.

The relation of parts is such that the outer ends, at least, of the work pieces are received in the centering rings prior to the entire stripping of the work pieces from the studs. As soon as the work pieces are received in the centering rings, members 46 and 55 may be returned in the manner described, member 66 still acting on the slides to cause the knurled jaw portions 38 and 39 to urge the outer ends of the work pieces against the knurled surfaces of the abutment rings so that the work pieces are forcibly held against rotation. At this juncture the tapping heads are thrown into operation and the taps are projected through the abutment rings and engage the work pieces to form internal threads therein. The abutment rings are of sufficiently large internal diameter to provide clearance for the taps.

When the tapping operation has been completed, valve lever 85 is manipulated so that member 66 is lifted quickly upwardly, the operator in the meantime having reloaded the transfer members. As member 66 moves upwardly the slides are retracted by spring 45 and withdraw the work pieces from the centering rings. Since the jaw portions are confined to the sides of the work pieces, the latter are enabled to drop freely as soon as they leave the centering rings. The operations as above described are now repeated.

It will be understood that in view of the separability of the jaw portions of the slides, these portions may be of different design to accommodate work pieces of different shapes. While the specific work handling mechanism herein described is designed to handle peripherally ribbed tubular fittings, it will be understood that the invention is not limited in this respect, nor to other details of form and construction which are susceptible of variation to meet different conditions.

Figure 7:
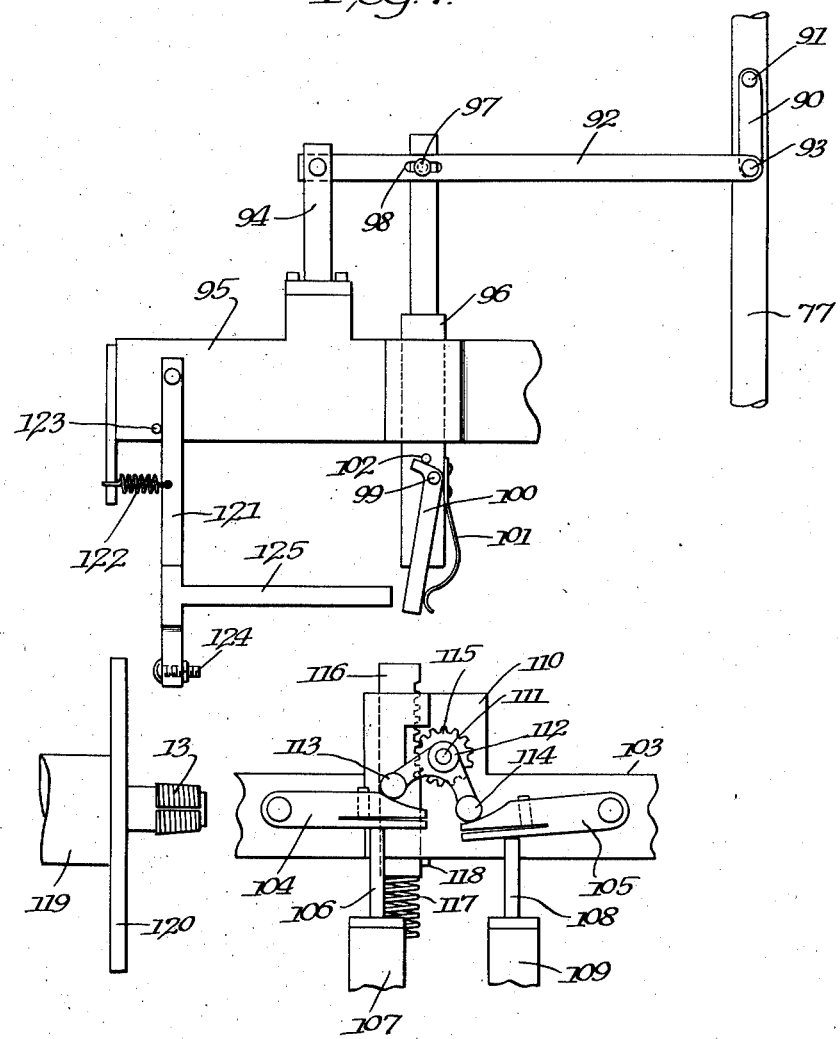
Figure 7 is an elevation of mechanism for automatically controlling the rotation and reciprocation of the tool.

Referring to Figure 7, reference numeral 90 designates a link pivoted at one end on piston rod 77 by means of a pin 91. The other end of link 90 is pivoted to one end of a link 92 by means of a pin 93, the other end of link 92 being pivotally supported on a pedestal 94 mounted on a fixed support 95.

Reciprocable in support 95 is a driving portion in the form of a slide 96 whose upper end has fixed thereto a pin 97 which is engaged in a longitudinally extending slot 98 of the link 92. Pivoted on the lower portion of slide 96 by means of a pin 99 is a pawl 100 biased in a clockwise direction by means of a spring 101 and limited by a stop 102 to the downwardly projecting relation shown.

A support 103 has pivoted thereto a pair of rocker arms 104 and 105 whose adjacent ends are split and provided with screws so that the split portions may be spread for purposes of adjustment. Arm 104 rests on the stem 106 of a valve 107, and arm 105 similarly rests on a stem 108 of a valve 109. Mounted on a bracket 110 on support 103 is a stud 111 on which is rockable a bell crank member 112 having arms of equal length provided with the rounded extremities 113 and 114 adapted to engage arcuate bearing surfaces of arms 104 and 105. A pinion 115 mounted on stud 111 and fixed to member 112 engages a driven portion in the form of a vertically reciprocable rack 116 which is positioned directly below the lower end of pawl 100. Rack 116 is urged upwardly by a spring 117, its upward movement being limited by a stop pin 118 which abuts the lower face of support 103.

Reference numeral 119 designates a spindle which is reciprocable and rotatable in either direction, this spindle carrying the tool 13 and having a radially expanded flange 120. An arm 121 pivoted on support 95 is normally held by a spring 122 against a stop 123, with the lower extremity of the arm, which may be provided with an adjustable abutment screw 124, in front of flange 120. Arm 121 carries an arm 125 which extends toward pawl 100 and lies in the plane of the latter. The direction of axial movement and the direction of rotation of spindle 119 are assumed to be controlled by known devices which are in turn controlled by a piston movable in one direction in a cylinder to cause the advance of the spindle and its rotation in a threading direction, and movable in the other direction in the cylinder to effect retraction of the spindle and its rotation in the reverse direction. The valve 107 is designed to supply air under pressure to one side of the piston and the valve 109 to the other.

With the parts in the position shown, arm 105 and valve stem 108 are depressed, which means that air has been supplied to the proper side of the piston so that the countershaft clutches have been actuated to cause unthreading rotation and retraction of the spindle. When valve 81 is operated in a manner to cause piston 77 to descend, pawl 100 eventually strikes the top of rack 116 forcing the latter downwardly and rocking member 112 in a counterclockwise direction so that arm 105 and valve stem 108 are permitted to rise under spring action, while arm 104 and stem 106 are depressed so that air is admitted to the other side of the piston and the clutches are operated in a manner to cause spindle 119 to be advanced and rotated in a threading direction. As the spindle is advanced flange 120 strikes the lower extremity of arm 121, and as the tapping operation is completed, arm 121 has been swung to such an extent that arm 125 will trip pawl 100 so that rack 116 is released and returns to the illustrated position under the action of spring 117. When piston 77 subsequently moves upwardly, spring 101 snaps pawl 100 back to the position shown, wherein it is ready to engage rack 116 upon the next descent of slide 96.

The disclosed control linkage, while a preferred design, may be various modified while retaining the feature of the interrupting means constituted by an arrangement such as the pawl kicked out in dependence upon the movement of the tool. I have shown valves for controlling the appropriate supply of fluid under pressure, but other means of communicating the control to the spindle operating devices may be utilized.

It will be understood that the invention is not limited to the disclosed form and arrangement of parts except as in the following claims.

I claim:

1. Apparatus of the class described comprising a pivoted work-transfer member swingable between a work-receiving position and a work-discharging position, and work holding means at the latter position comprising a fixed abutment and an annular centering means in front of the free end of said member, and means movable to remove the work from said member and press it through said centering means and against said abutment.

2. Apparatus of the class described comprising a pivoted work-transfer member swingable between a work-receiving position and a work-discharging position, a fixed abutment and an annular centering means in front of the free end of said member when the latter is in work-discharging position, and means slidable in the longitudinal direction of said member when it is in the latter position for removing the work from said member and pressing it through said centering means and against said abutment.

3. Apparatus of the class described comprising a pivoted work-transfer member swingable between a work-receiving position and a work-discharging position, said member having at its free end a longitudinally extending stud for the reception of a tubular work piece, and means operated when said member is in work-discharging position to strip the work piece from said stud, said stripping means being constituted by a slide movable longitudinally of said member when said member is in work discharging position, said slide having portions which engage the work piece at diametrically opposite points during the stripping operation.

4. Apparatus of the class described comprising a pivoted work-transfer member swingable between a work-receiving position and a work-discharging position, said member having at its free end a longitudinally extending stud for the reception of a tubular work piece, a fixed abutment spaced from said stud when said member is in work-discharging position, and means operated when said member is in the latter position to strip the work piece from said stud and press it against said abutment, said abutment being apertured to pass a tool to the interior of the work piece.

5. Apparatus of the class described comprising a pivoted work-transfer member swingable between a work-receiving position and a work-discharging position, a fixed abutment at the free end of said member when the latter is in work-discharging position, and means movable to remove the work from said member and press it against said abutment, said abutment having an aperture through which a tool may be engaged with the work.

6. Apparatus of the class described comprising a pivoted work-transfer member swingable between a work-receiving position and a work-discharging position, a fixed abutment at the free end of said member when the latter is in work-discharging position, means movable to remove the work from said member and press it against said abutment, said abutment having an aperture through which a tool may be engaged with the work, and means positioned in advance of said abutment for centering the work with respect to said aperture.

7. Apparatus of the class described comprising a pivoted work-transfer member swingable between a work-receiving position and a work-discharging position, a fixed abutment at the free end of said member when the latter is in work-discharging position, and reciprocable means movable in one direction to remove the work from said member and press it against said abutment and movable in the other direction to release the work from the abutment.

8. Apparatus of the class described comprising a pivoted work-transfer member swingable between a work-receiving position and a work-discharging position, a fixed abutment at the free end of said member when the latter is in work-discharging position, reciprocable means movable in one direction to remove the work from said member and press it against said abutment and movable in the other direction to release the work from the abutment.

9. Apparatus of the class described comprising a pivoted work-transfer member swingable between a work-receiving position and a work-discharging position, a fixed abutment at the free end of said member when the latter is in work-discharging position, reciprocable means movable in one direction to remove the work from said member and press it against said abutment, said abutment having an aperture through which a tool may be engaged with the work, and means positioned in advance of said abutment for centering the work, said reciprocable means serving upon movement in the other direction to release the work from said abutment and withdraw it from said centering means.

10. Apparatus according to claim 9 wherein the construction and arrangement of parts are such that the work may drop freely upon withdrawal from said centering means.

11. Apparatus of the class described comprising a pivoted work transfer member swingable between work-receiving and work-discharging positions, a slide reciprocable in the plane which said work transfer member occupies when it is in work-discharging position, actuating means for said member and slide reciprocable transversely of the plane of said slide, said actuating means in one direction of movement serving to move said member from work-receiving toward work-discharging position and in the other direction of movement to advance said slide to remove the work from said member and then to return said member, and means for returning said slide.

12. Apparatus according to claim 11 wherein said actuating means has a cam surface cooperating with said work transfer member to effect the first-mentioned movement of said member and has another cam surface cooperating with said slide to advance the same.

13. Apparatus according to claim 11 wherein said actuating means has a cam surface cooperating with said work-transfer member to effect the first-mentioned movement of said member, has another cam surface cooperating with said slide to advance the same, and has a striker portion, said member having a lug engaged by said striker portion to return said member.

14. Apparatus according to claim 11 wherein said member and slide are duplicated and the actuating means is in the form of a single member which effects simultaneous operation of the sets of said members and slides.

15. Apparatus of the class described comprising a pivoted work transfer member swingable between loading and discharging positions, said member having a longitudinally extending stud at its free end for the reception of a tubular work piece, a fixed socket opposite said stud when said member is in discharging position, and reciprocating means operable in one direction of movement and when said member is in discharging position to strip the work piece from said stud and insert it in said socket, the relation of parts being such that the work piece enters the socket prior to passing entirely from the stud but is free of the stud when entirely inserted in the socket so that said member is free to be returned.

16. Apparatus according to claim 15 wherein said reciprocating means has jaws which are adapted to engage laterally projecting portions of the work piece so that upon movement of said means in the other direction the work piece is withdrawn from the socket.

17. Apparatus according to claim 15 wherein said reciprocating means has lateral jaws only which are adapted to engage laterally projecting portions of the work piece so that upon movement of said means in the other direction the work piece is withdrawn from the socket and freely drops from said jaws.

18. In apparatus of the class described, a tapping head, a reciprocable tap carried by said head, a work holder comprising a frame, an annular abutment carried by said frame coaxially with said tap, an expansive annular work centering device carried by said frame on the opposite side of said abutment from said head, and means for presenting a tubular work piece in front of said centering device and for pressing the work piece through said centering device and against said abutment, the tap being projectable through the opening of said abutment to thread the work piece internally.

19. Apparatus of the class described comprising a frame, a horizontally reciprocable slide guided in said frame, a work-transfer member in the form of an arm pivoted to said frame and swingable between a vertical loading position and a horizontal discharging position wherein it directly overlies said slide with a work piece carried by the arm positioned in front of said slide, an annular abutment carried by the frame and in front of the work piece when said arm is in discharging position, means for moving said slide to remove the work piece from said arm and press it against said abutment, means for swinging the arm between the described positions, and means for retracting the slide.

20. The combination with a machine tool comprising a reciprocable spindle, and work positioning means including a reciprocable element, of control means for the reciprocation of the spindle including a control member movable between two positions, a slide connected with said reciprocable element to move therewith, a pawl carried by said slide and adapted to engage said control member upon movement of the slide in one direction to move said control member from one position to the other, means actuated upon movement of said spindle in one direction to trip said pawl and release said control member, and means to return the released control member to its first position.

21. The combination with a machine tool comprising a reciprocating spindle, of control means for the reciprocation of the spindle including a control member movable between two positions; and operating means for said member including an operating train having a driving portion and a driven portion, a pawl carried by said driving portion and operatively engaged with said driven portion for moving said member from one position to the other, means actuated upon movement of said spindle in one direction to trip said pawl whereby said driven member and therewith said control member are released, and means to return the released control member to its first position.

EDWARD W. BAKER.